US012031372B2

(12) United States Patent
Dreyer et al.

(10) Patent No.: US 12,031,372 B2
(45) Date of Patent: Jul. 9, 2024

(54) SLIDING DOOR ASSEMBLY

(71) Applicant: Assa Abloy Entrance Systems AB, Landskrona (SE)

(72) Inventors: Roger Dreyer, Bjarred (SE); Max Koskinen, Lund (SE); Jakob Alvelid, Lund (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 73 days.

(21) Appl. No.: 17/606,652

(22) PCT Filed: May 14, 2020

(86) PCT No.: PCT/EP2020/063422
§ 371 (c)(1),
(2) Date: Oct. 26, 2021

(87) PCT Pub. No.: WO2020/239453
PCT Pub. Date: Dec. 3, 2020

(65) Prior Publication Data

US 2022/0195780 A1 Jun. 23, 2022

(30) Foreign Application Priority Data

May 24, 2019 (SE) .................................... 1930170-4

(51) Int. Cl.
*E05F 15/635* (2015.01)
*E05D 15/06* (2006.01)

(52) U.S. Cl.
CPC ........ *E05F 15/635* (2015.01); *E05D 15/0626* (2013.01); *E05Y 2400/654* (2013.01);
(Continued)

(58) Field of Classification Search
CPC ............... E05F 15/635; E05D 15/0626; E05Y 2400/654
See application file for complete search history.

(56) References Cited

U.S. PATENT DOCUMENTS 1,952,681 A * 3/1934 Peelle .................. E05F 15/635 49/358
2,595,291 A * 5/1952 Ramsey .................. E05F 15/44 49/27

(Continued)

FOREIGN PATENT DOCUMENTS

DE 202007017202 2/2008
EP 1889994 2/2008

(Continued)

OTHER PUBLICATIONS

International Search Report in PCT/EP2020/063422 mailed Jul. 27, 2020.
Swedish Search Report in 1930170-4 mailed Dec. 18, 2019.

*Primary Examiner* — Gregory J Strimbu
(74) *Attorney, Agent, or Firm* — Wissing Miller LLP

(57) ABSTRACT

A sliding door assembly comprises a sliding door leaf, a sliding door rail, and a door operating assembly for operating the door leaf. The door operating assembly has a drive unit to drive the door leaf along the sliding door rail. The sliding door leaf has at least one wagon member attached thereto. The wagon member is connected with the drive unit. An electric component is mounted to the sliding door leaf. A cable arrangement transfers power and/or communication signals between the door operating assembly and the electric component. The cable arrangement comprises a flexible portion with an end section that is fixed in relation to the sliding door leaf to allow the flexible portion to extend to compensate for the movement of the sliding door leaf.

14 Claims, 3 Drawing Sheets

(52) U.S. Cl.
CPC ... *E05Y 2600/502* (2013.01); *E05Y 2600/626* (2013.01); *E05Y 2600/63* (2013.01); *E05Y 2800/344* (2013.01); *E05Y 2900/134* (2013.01)

(56) References Cited

U.S. PATENT DOCUMENTS

| | | | | |
|---|---|---|---|---|
| 4,675,938 | A * | 6/1987 | Bundschuh | E05F 3/16<br>16/64 |
| 5,251,402 | A * | 10/1993 | Richardson | E05D 15/08<br>49/404 |
| 5,536,061 | A | 7/1996 | Moore et al. | |
| 7,992,346 | B2 * | 8/2011 | Finke | E05F 15/72<br>49/118 |
| 2003/0172592 | A1 * | 9/2003 | Krimmel | G09F 9/33<br>49/413 |
| 2013/0020036 | A1 * | 1/2013 | Stewart | E05F 15/635<br>160/202 |

FOREIGN PATENT DOCUMENTS

| | | |
|---|---|---|
| EP | 3276115 | 1/2018 |
| EP | 3453820 | 3/2019 |
| RU | 2682297 | 3/2019 |

* cited by examiner

SLIDING DOOR ASSEMBLY

This application is a 371 of PCT /EP2020/063422, filed on May 14, 2020, published on Dec. 3, 2020 under publication number WO 2020/239453, which claims priority benefits from Swedish Patent Application No. 1930170-4, filed on May 24, 2019, the disclosure of which is incorporated herein by reference.

TECHNICAL FIELD

The present invention relates to a sliding door assembly and an attachment device for a sliding door assembly.

BACKGROUND

The use of automatic opening and closing of sliding doors is commonly known to facilitate access to buildings, rooms and other areas.

Conventional sliding doors are driven by a drive unit mounted at the door frame for driving a wagon along a rail via a driving belt. The wagon, in turn, is attached to the sliding door leaf, whereby the sliding door leaf is driven by the drive unit.

Often, power consuming devices of different kinds, such as sensor units, lights etc, are mounted to the door leaf. To provide power to the power consuming device cables connects the door operator of the sliding door system and the components mounted to the door leaf. This is associated with a number of challenges.

In most cases, the cables are integrated into a hollow rigid belt which serves to drive the door leaf by means of a motor of the door operator. The cables are routed from said hollow rigid belt downwards to the door blade. Such a hollow rigid belt is associated with high costs. Further, it is cumbersome for the service personnel to install and mount.

It would therefore be beneficial to provide a more simple solution to provide communication and/or power between the operator and the components mounted to the door leaf.

SUMMARY

An object of the present invention is therefore to provide a solution to the above-mentioned problem, reducing the disadvantages of prior art solutions.

According to a first aspect a sliding door assembly is provided. The sliding door assembly comprises at least one sliding door leaf, a sliding door rail and a door operating assembly for operating the at least one sliding door leaf. The door operating assembly comprises a drive unit configured to drive the at least one sliding door leaf along the sliding door rail.

The sliding door assembly comprises at least one wagon member movable along the sliding door rail. Each sliding door leaf has one of the at least one wagon members attached thereto, said one of the at least one wagon member being in driving connection with the drive unit.

The sliding door assembly further comprises an electric component mounted to the sliding door leaf and a cable arrangement for transferring power and/or communication signals between the door operating assembly and the electric component. The cable arrangement comprises a cable member routed to the electric component from the door operating assembly. The cable member comprises a flexible portion having an end section which is fix in relation to the sliding door leaf to allow for extension of the flexible portion to compensate for the movement of said sliding door leaf.

BRIEF DESCRIPTION OF THE DRAWINGS

Embodiments of the invention will be described in the following; reference being made appended drawings which illustrate non-limiting examples of how the inventive concept can be reduced into practice.

DETAILED DESCRIPTION OF EMBODIMENTS

Figure 1:
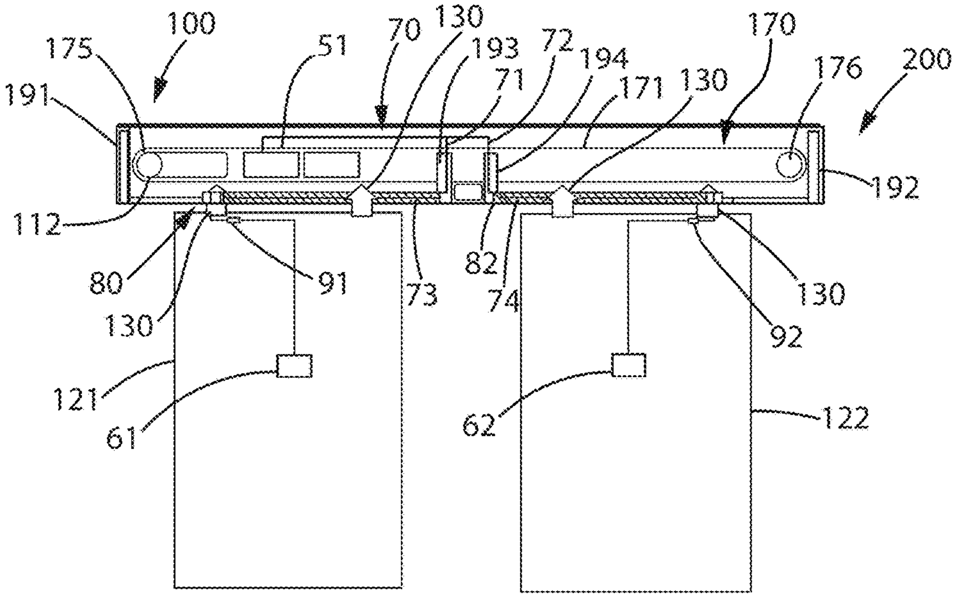
FIG. 1 shows a schematic view of a sliding door arrangement according to an embodiment of the present invention.

An example of a door operating assembly 100 will be described in the following. With reference to FIG. 1. 1 a sliding door assembly 200 comprises at least one sliding door leaf 121, 122, a drive unit 112, a sliding door rail 110, and a door operating assembly 100 for operating the sliding door leaf 121, 122. The sliding door leaf 121, 122 is driven by the drive unit 112 along the sliding door rail 110 which is fixed relative a door frame 102. The door operator 100 comprises the drive unit 112. Thus, the drive unit 112 is configured to drive the at least one sliding door leaf 121, 122 along the sliding door rail 110.

The door leaf(s) 121, 122 may be made of wood, metal, plastic, glass or other suitable materials. The door leaf 121, 122 may also be a fire proof door having a fire resistant core made of various suitable materials generally known in the art.

A drive member 130 of the sliding door assembly is in driving connection with the drive unit 112. The drive member 130 is mounted to the sliding door leaf 121, 122. The drive member 130 may thus be arranged to transfer torque provided by the drive unit 112 of the door operator 100 to the sliding door leaf 121, 122. The drive member 130 is in the form of a wagon member 130.

The door leaf 121, 122 is slidingly connected to the sliding door rail 110 for example by means of the wagon member 130. The wagon member 130 is movable along the sliding door rail, e.g. is arranged to be in movably connected to the sliding door rail 110. The door leaf(s) 120, 121 are suspended to the sliding door rail 110 by means of the wagon member(s).

In one embodiment, the wagon unit is engaging with the sliding door rail 110 via at least one wheel allowing the sliding door leaf 121, 122 to move into a closed and open position along the horizontal sliding door rail 110. The at least one wheel may be a low friction wheel.

In one embodiment, the wagon unit is engaging with the sliding door rail 110 via a sliding contact between the wagon unit and the sliding door rail 110.

Each sliding door leaf 121, 122 may have one or more wagon member 130 attached thereto. Referencing FIG. 1, each movable door member has a first and second wagon member 130 attached thereto. Said first and second wagon member being disposed close to a first and second vertical edge of the door leaf, respectively.

Several applications for an automated sliding door assembly require the sliding door leaf 121, 122 to serve as a barrier minimizing any transfer of mediums between the rooms separated by the sliding door assembly. For such applications the sliding door leaf 121, 122 may be provided with sealings adapted to be pushed against the door frame 102 and/or the ground when the sliding door leaf 121, 122 is in a closed position.

Further referring to FIG. 1, the door operator 100 may comprise a drive unit 112 which may be of any conventional type. Typically, the drive unit 112 comprises an electric motor and a reduction gearing providing the necessary torque to move the sliding door leaf 121, 122 between the open and closed position. According to the present example a belt drive arrangement connects the drive unit 112 with one of the wagon units 130 which works as a drive member. Advantageously, the drive unit 112 is adapted to be connected to the door frame 102 of the sliding door assembly, or even mounted within the interior of the upper part of the door frame 110.

In one embodiment, the drive member 130 is in driving connection with the drive unit 112 by means of a belt drive arrangement 170. The belt drive arrangement 170 comprises a first belt wheel 175 and a second belt wheel 176. Said first and second wheel are connected by a belt 171.

Again referring to FIG. 1, the drive member 130 is connected to a belt 171 driven by the drive unit 112. The drive belt 171 is preferably a synchronous endless drive belt extending between two wheels 175 and 176. The first wheel 175 is directly driven by the drive member 112 and the second wheel 176 is rotationally supported by a console being fixed to the door frame 102. The wheels 175, 176 may be cogged wheels, whereby the belt 171 may be a cogged belt.

In one embodiment, in which the sliding door assembly 200 comprises a first sliding door leaf 121 and a second sliding door leaf 122, a wagon member 130 attached to the first sliding door leaf 121 may be connected to a lower belt portion of the drive belt 171 and a wagon member 130 attached to the second sliding door leaf 122 may be connected to an upper belt portion of the drive belt 171. The upper and lower belt portion may be arranged opposite and parallel to each other between the wheels 175 and 176. The upper and lower belt portions moves in opposite direction when the belt arrangement is driven, whereby the wagon members of the first and second sliding door leaf moves in opposite directions, e.g. the closing or opening directions of the sliding door leafs.

According to the present invention, an electric component 61, 62 is mounted to the sliding door leaf 121, 122. The electric component may be any of device which utilizes communication and/or power to function. The electric component may for example be any one of: a lighting device, a sensor device, a user interface device, a panic bar, an electric lock etc.

To power and/or allow for operation of the electric component 61, 62 the sliding door assembly 200 further comprises a cable arrangement 70 for transferring power, e.g. electric power, and/or communication signals between the door operating assembly 100 and the electric component 61, 62. The cable arrangement 70 comprises a cable member 71, 72 routed to the electric component 61, 62 from the door operating assembly 100. In one embodiment, the door operating assembly 100 may comprise an electric terminal 51 to which the cable member 71, 72 is connected. In one embodiment, the electric terminal 51 is in an independent sub-unit mounted in the vicinity of the drive unit and the sliding door leafs. In one embodiment, the electric terminal 51 is mounted in the same casing as the drive unit.

The cable member 71, 72 comprises a flexible portion 73, 74. The flexible portion has an end section which is fix in relation to the sliding door leaf 121, 122 to allow for extension of the cable to compensate for the movement of said sliding door leaf 121, 122. The end section is accordingly fix in relation to sliding door leaf 121, 122 which has the electric component mounted thereto, whereby the cable arrangement 70 is configured to transfer power and/or communication signals to said electric component mounted to said sliding door leaf Thus, power and/or communication to the electric component may be transferred without implementing complex and often expensive winding solutions for allowing the cables to follow the movements of the sliding door leafs.

In one embodiment, the second end section of the flexible portion (73, 74) is in connection with the door operating assembly. In one embodiment, the second end section is fixated by means of a flexible cable support bracket 193, 194. Said second end section may be fixed to the door operating assembly by means of said flexible cable support bracket 193, 194.

Further referencing FIG. 1, at least a section of the flexible portion 73, 74 may be routed in a substantially horizontal direction. Thus, the flexible portion 73, 74 is elongated and compressed in a direction parallel to the movements of the at least one sliding door leaf 121, 122. This decreases the wear on the cable arrangement and further allows for easier concealing of the cable arrangement. Advantageously, the flexible portion is horizontally arranged.

In one embodiment, the (first) end section of the flexible portion 73, 74 which is fix in relation to the sliding door leaf 121, 122 and the second end section of said flexible portion 73, 74 which is fixed by means of the flexible cable support bracket 193, 194 are arranged at a distance from each other along a horizontal direction, e.g. along the sliding door rail 110. Preferably, said section of the flexible portion 73, 74 may be arranged parallel to the sliding door rail 110 above the at least one sliding door leaf 121, 122. In one embodiment, the entire flexible portion 73, 74 is routed in a substantially horizontal direction.

To allow for the horizontal routing the sliding door assembly 200 may further comprise a support structure 80. The support structure 80 extends parallel to the sliding door rail 110. The support structure 80 may also extend horizontally along the sliding door rail 110. The support structure 80 is arranged to support the flexible portion 73, 74 along the sliding door rail 110. The flexible portion may be routed at least partly along said support structure 80. Preferably, said support structure 80 is arranged above the at last one sliding door leaf 121, 122.

The flexible portion 73, 74 may extend horizontally towards the sliding door leaf 121, 122 in an opening direction of the sliding door leaf 121, 122 such that said flexible portion 73, 74 is in a relaxed state when the sliding door leaf 121, 122 is in a closed position and an extended state when the sliding door leaf 121, 122 is in an opened position. The usual opening and closing pattern of the sliding door leafs is associated with the sliding door leafs being in their closed position for longer period of times than their opened position. Thus, it is particularly advantageous in terms of the wear and tear of the cable arrangement 70 that the flexible portion of the cable member is in a relaxed state for longer periods of time.

An opening and closing direction is herein defined as the direction which the sliding door leaf moves during an opening and closing operation of the sliding door assembly.

Hence, the (first) end section of the flexible portion 73, 74 which is fix in relation to the sliding door leaf 121, 122 may be arranged distally in relation to the second end section of said flexible portion 73, 74 which is fixed by means of the flexible cable support bracket 193, 194 in the opening direction of the sliding door leaf 121, 122.

In one embodiment, the end section of flexible portion 73, 74 is fix in relation to the sliding door leaf 121, 122 by means of being attached to the wagon member attached to said sliding door leaf 121, 122. Thus, a less complex solution for routing of power and/or communication to the electric component is achieved, due to no additional brackets having to be mounted to the sliding door leaf for attaching the cable. Instead the functionality may be integrated into the wagon, which makes the sliding door assembly more cost-efficient and easier to install for service personnel.

In an alternative embodiment, the end section of the flexible portion may be fix in relation to the sliding door leaf 121, 122 by means of being attached to said sliding door leaf.

In one embodiment, the door operating assembly 100, the sliding door rail 110 and the flexible support brackets are comprised in a header unit of the sliding door arrangement 200. The header unit may be disposed above the sliding door leafs. The header unit may be mounted to a wall above said sliding door leafs. For example, the sliding door assembly according to the above may have two sliding door leafs, each having an electric component mounted thereto. Accordingly, the sliding door assembly may comprise a first sliding door leaf 121 and a second sliding door leaf 122. Analogously to the above described embodiments, the sliding door assembly comprises a first electric component 61 mounted to the first sliding door leaf 121 and a second electric component 62 mounted to the second sliding door leaf 122.

The cable arrangement 70 may thus comprise a first cable member 71 routed to the first electric component 61 and a second cable member 72 routed to the second electric component 62. The first cable member 71 and the second cable member 72 each comprises a flexible portion 73, 74, e.g. the first cable member comprises a flexible portion 73 and the second cable member 73 comprises a flexible portion 74. The flexible portion 73, 74 of the first and second cable member, each has an end section which is fix in relation to the first and second sliding door leaf, respectively, to allow for extension of the first and second cable members to compensate for the movement of the first 121 and second 122 sliding door leaf.

The second end section of each flexible portion (73, 74) may be in connection with the door operating assembly. In one embodiment, the second end section of each of the said flexible portions is fixated by means of a first and second flexible cable support bracket 193, 194, respectively. Said second end sections may be fixed to the door operating assembly by means of said flexible cable support brackets 193, 194. In one embodiment, the (first) end section of each of the flexible portions is attached to a wagon member in accordance to the above described example.

The flexible portion 73 of the first cable member 71 may extend horizontally towards the first sliding door leaf 121 in an opening direction of the first sliding door leaf 121. The flexible portion 74 of the second cable member 72 may extend horizontally towards the second sliding door leaf 122 in an opening direction of the second sliding door leaf 122 in an opening direction of the second sliding door leaf 122.

The flexible portions are arranged such that said flexible portions are in a relaxed state when the first and second sliding door leaf are in a closed position and an extended state when the first and second sliding door leaf are in an opened position.

As depicted in FIG. 1, the flexible portion 73 of the first cable member 71 extends from a central position disposed in the proximity of a vertical centerline of the sliding door assembly, outwardly in the opening direction of said first sliding door leaf 121 prior to being routed downwardly towards the first electric component 61. Similarly, the flexible portion 74 of the second cable member 72 extends from a central position disposed in the proximity of said vertical centerline of the sliding door assembly, outwardly in the opening direction of said second sliding door leaf 122 prior to being routed downwardly towards the second electric component 62.

Hence, the (first) end section of the flexible portion 73 of the first cable member 71 may be arranged distally in relation to the second end section of said flexible portion 73 in the opening direction of the first sliding door leaf 121, e.g. in an outward direction from the vertical centerline of the sliding door assembly.

Similarly, the (first) end section of the flexible portion 74 of the second cable member 72 may be arranged distally in relation to the second end section of said flexible portion 74 in the opening direction of the second sliding door leaf 121, e.g. in an outward direction from the vertical centerline of the sliding door assembly opposite to the opening direction of the first sliding door leaf.

Figure 2:
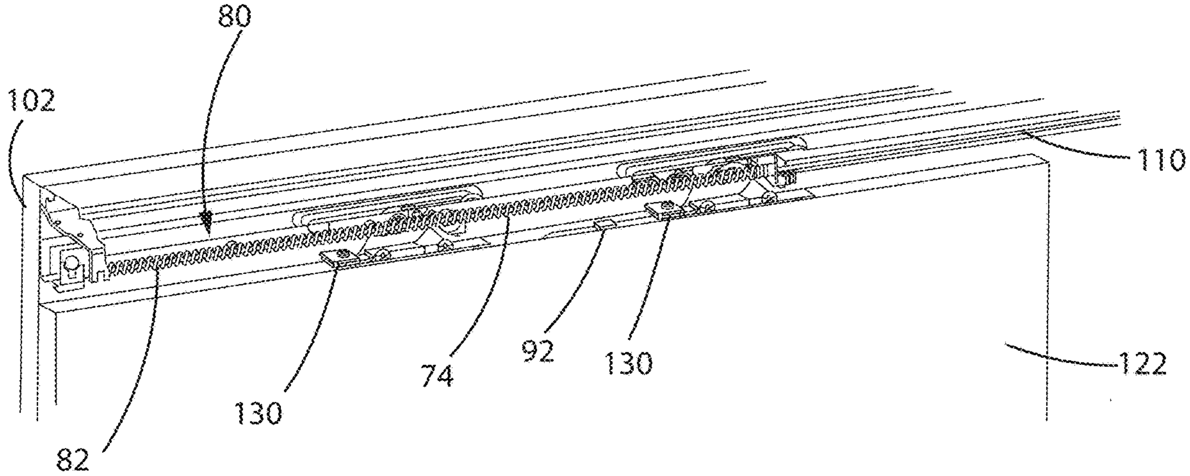
FIG. 2 shows a schematic perspective view of a sliding door arrangement according to an embodiment of the present invention.
Figure 3:
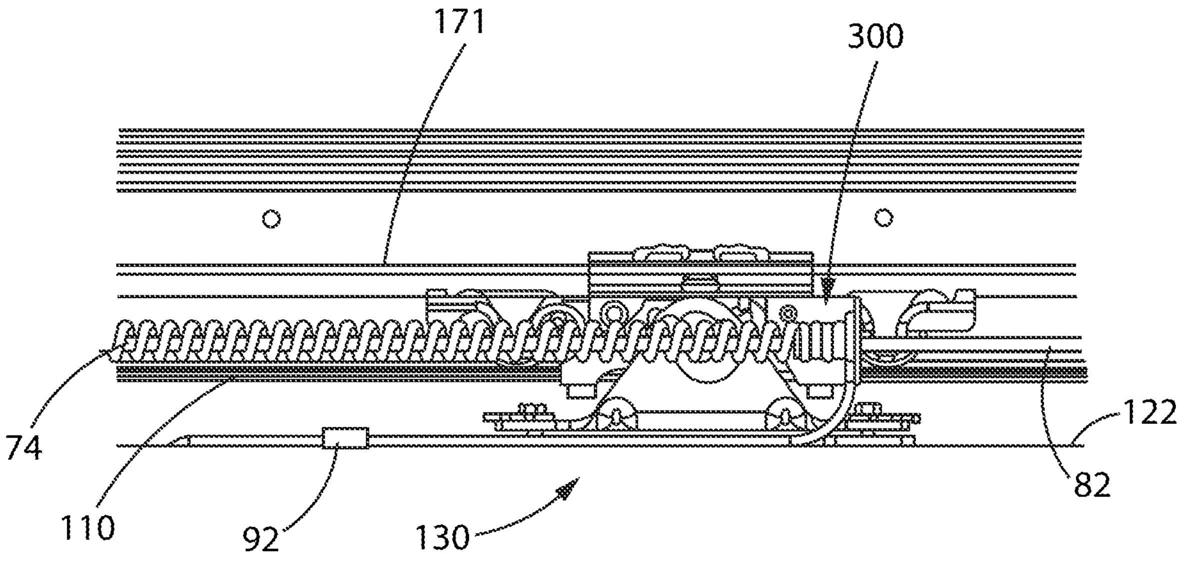
FIG. 3 shows a detailed schematic view of a wagon member for a sliding door arrangement according to an embodiment of the present invention.
Figure 4:
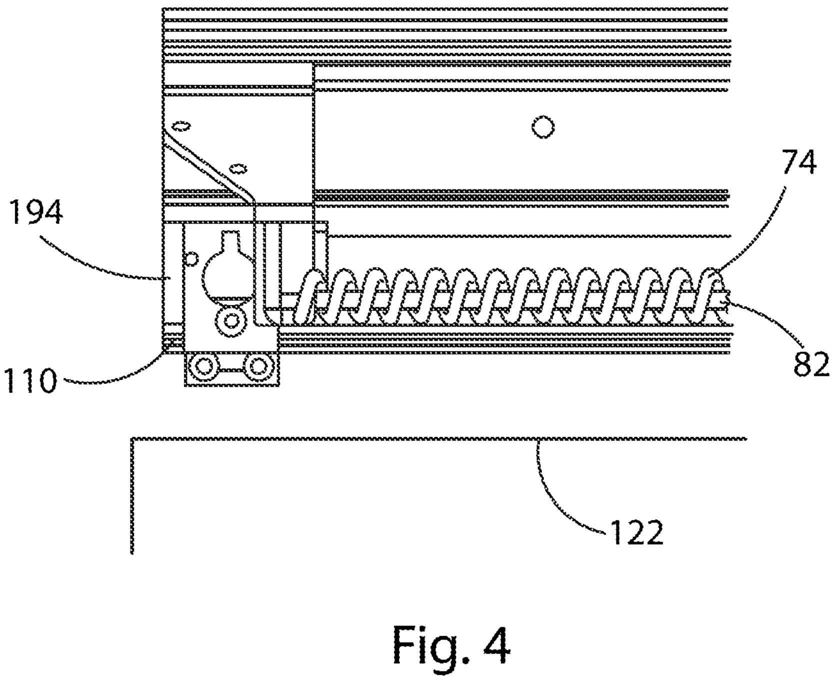
FIG. 4 shows a detailed schematic view of a cable bracket for a sliding door arrangement according to an embodiment of the present invention.

As more closely depicted in FIG. 2-4, the support structure 80 may comprise a support wire 82 suspended along the sliding door rail 110. In one embodiment, the support structure 80 may be comprised of said support wire 82.

The flexible portion may thus be routed at least partly along said support wire 82. Preferably, said support wire 82 is arranged above the at last one sliding door leaf 121, 122.

The support wire 82 may be suspended by means of support wire brackets 191, 192. Thus, a first end of the support wire 82 may be attached to a first support wire bracket 191 and a second opposite end of said support wire 82 may be attached to a second support wire bracket 192. The first and second support wire bracket may be attached to the door operating assembly or to a wall. The first end of the support wire 82 may be suspended from a position disposed at a first side of the opening into which the sliding door arrangement is mounted, whereby the second end of the support wire 82 may be suspended from a position disposed at a second opposite side of said opening.

In one embodiment, a single continuous wire may extend along the sliding door rail. In one embodiment, multiple support wire sections arranged coaxially to each other may form the support structure. A support wire allows for a more compact support structure with a smaller cross-section, whereby a more compact and space-efficient sliding door leaf is achieved.

In one embodiment, the support wire is in an elastic material, e.g. is in the form an of an elastic support wire. The elastic support wire allows for easy alteration to different sliding door assemblies by means of extending the support wire in accordance with the width of the door opening covered by the sliding door assembly.

The elastic support wire is particularly advantageous in combination with having the flexible portion arranged such that it is in a relaxed state when the sliding door leaf is in a closed position and in an extended state when the sliding door leaf is in an opened position. This is due to the support wire and flexible portion bulging downwards because of their weight. Thus, the flexible portion will be pulled in an upward direction and compressed in a downward direction. Hence, the risk for the flexible portion getting tangled into itself or the support wire is mitigated.

In one embodiment, the flexible portion 73, 74 of the cable member 71, 72 is in the form of a spiraled cable portion, e.g. in the form of a spiral cable or a phone cord. This allows for compression and extension of the flexible portion in a simple manner. Compared to for example a continuous elastic wire in an elastic material, the spiraled design is less susceptible for wear and high loads due to the sliding door leafs extending it. Hence, the spiral cable solution enables a more safe and durable sliding door arrangement.

In one embodiment, the flexible portion 73, 74 may be wrapped around the support structure, e.g. the support wire. Thus the flexible portions compression and extension occurs mainly in a horizontal manner, further reducing the wear on the cable arrangement. Further, the flexible portion is prevented from slacking and moving vertically during the movement of the door, whereby a safer sliding door arrangement is achieved.

The flexible portion 73, 74 is thus twisted around the support structure, e.g. the support wire. Notably, the flexible portion may be twisted one or multiple revolutions around said support structure. However, it may also only be twisted less than revolution around side support structure, i.e. only partially surrounding said support structure.

In one embodiment, the flexible portion 73, 74 is in the form of the spiraled cable portion, whereby the structure comprises an elongated support member extending through the spiraled cable portion.

In one embodiment, the support wire 82 extends through the spiraled cable portion. The loops of the spiraled portion are thus supported by said support wire 82.

Further referencing FIG. 1-4, at least one sliding door leaf 121, 122 is provided with a housing plug 91, 92 for routing the cable member to the electric component mounted to said sliding door leaf 122. Hence, the cable member may comprise a door leaf cable section connecting said housing plug 91, 92 and the electric component mounted 61, 62 to said sliding door leaf 121, 122. Preferably, said housing plug 92 is disposed on an upper edge, e.g. surface, of the sliding door leaf 122.

FIG. 3 schematically depicts a wagon member according to one embodiment. As previously described with reference to FIG. 1, the cable member 71, 72 is routed from the door operating assembly to the electric component mounted to the sliding door leaf via the wagon member 130 attached to said sliding door leaf. The section of the cable member 71, 72 may be fix to said wagon member 130 by means of an attachment device 300 which will be further described with reference to FIG. 5*a*-*b*.

The attachment device 300 comprises apertures 316, 326 for allowing passage of the support wire 82 through said attachment device 300. The attachment device 300 further comprises a locking arrangement for receiving and fixating the end section of the flexible portion 73, 74.

Said attachment device 300 is arranged coaxially to the support wire 82. Accordingly, said aperture 316, 326 may be arranged coaxially to said support wire 82, whereby said support wire 82 extends through said aperture. The attachment device 300 may accordingly move together with the sliding door leaf along the support wire 82.

Figure 5A:
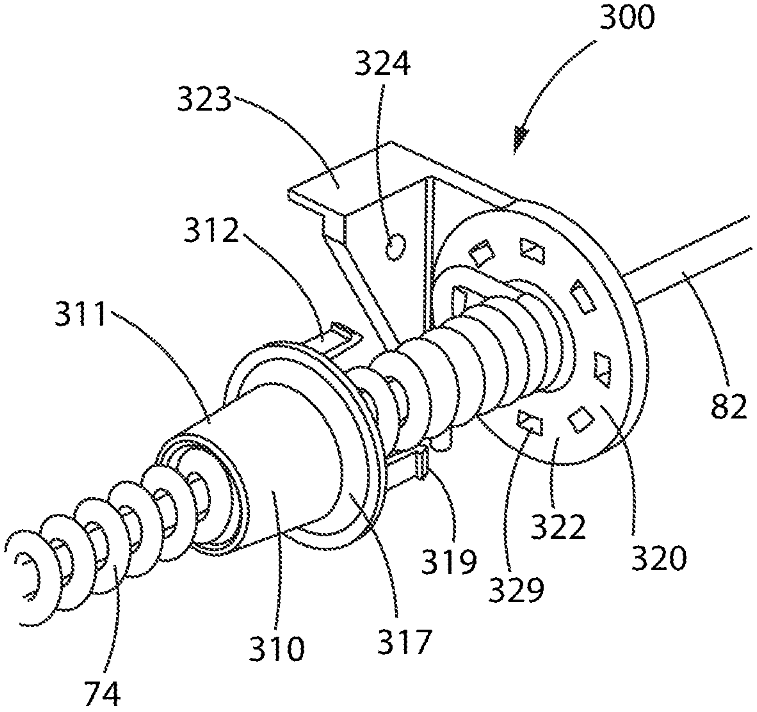
FIG. 5*a*-*b* show detailed views of an attachment device for a sliding door arrangement according to an embodiment of the present invention.
Figure 5B:
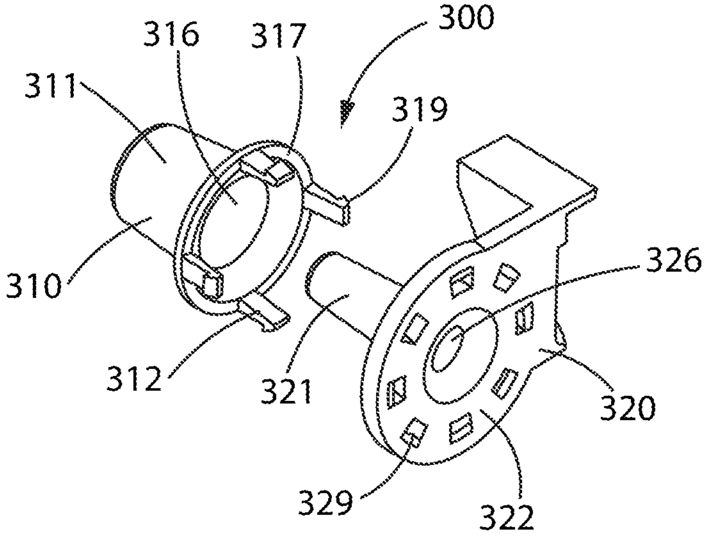

Further referencing FIG. 5*a*-b, the end section of the flexible portion 73, 74 is fix to the wagon member 30 by means of the attachment device 300 attached to the wagon member 130. The attachment device 300 comprises a first locking member 310 provided with a first locking member aperture 316 arranged to receive the support wire 82 and the end section of flexible portion 73, 74 and a second locking member 320 provided with a locking protrusion 321 around which the end section of the flexible portion 73, 74 is wrapped. The locking protrusion 321 is provided with a second locking member aperture 326 coaxial with the first locking member aperture 316. The second locking member aperture is arranged to allow passage of the support wire 82. The attachment device 300 further comprises a connecting arrangement 312, 319, 329 for connecting the first and second locking member and thereby fixating the end section of the flexible portion 73, 74 between said first and second locking member.

Thus, the flexible portion of the cable may be fixated to the wagon member in a simple manner which also compared to a conventional pinching fixation of the cable allows for a certain degree of freedom of movement. This further decreases the wear of the cable arrangement.

By means of coming into contact with inner surface of the first locking member aperture 316, the end section of the flexible portion wrapped around the locking protrusion 321 will be compressed and retained between said inner surface of the first locking member aperture 316 and the locking protrusion 321. Accordingly a locking section 311 of the first locking member is provided with the first locking member aperture 316, whereby said locking section 311 is arranged to at least partially surround the locking protrusion 321.

Hence, the first locking member 310 comprises the locking section 311 provided with the first locking member aperture 316. The locking section 311 is arranged to at least partially surround the locking protrusion 321 when the first and second locking members are connected and thereby fixate the end section of the flexible portion 73, 74 between the locking protrusion 321 and an inner surface of said locking section 311.

The inner surface of the locking section 311 of the first locking member 310 and the outer surface of locking protrusion 321 of the second locking member 320, e.g. the outer surface which the end section of the flexible portion is wrapped around, may be conical. The conical arrangement allows some degree of movement although the flexible portion is fixated to the wagon member. This reduces the wear on the cable arrangement.

In one embodiment, the inner surface of the locking section 311 of the first locking member 310 and the outer surface of locking protrusion 321 of the second locking member 320, e.g. the outer surface which the end section of the flexible portion is wrapped around, may be funnel shaped. The funnel shape makes it easier to accommodate different cable diameters, since adapting to a different cable diameter only requires a small displacement of the cable along the outer surface for achieving a sufficient locking.

In one embodiment, the inner surface of the locking section 311 of the first locking member 310 and the outer surface of locking protrusion 321 of the second locking member 320 may be tapered in a direction opposite to the horizontal direction which the end section of the flexible portion 73, 74 is received through the first locking member aperture 316 and is wrapped around the locking protrusion 321.

The cable member 73, 74 may thus be routed through attachment arrangement 300 and then routed downwards to the electrical component mounted to the sliding door leaf 121, 122. Accordingly, the cable member, e.g. the end section of the flexible portion of said cable member, is wrapped around the locking protrusion 311 and fixated by means of the first and second locking member and routed downwards to the electrical component mounted to the sliding door leaf 121, 122.

The first locking member 310 may comprise a first locking member base 317. The second locking member may comprise a second locking member base 322. The first locking member base 317 may be arranged to abut to the second locking member base 322 when the first and second locking member are connected. The locking protrusion 321 may protrude from the second locking member base 32

In one embodiment, the connecting arrangement may comprise a set of fastening elements for connecting the first and second locking member. Accordingly, the first and second locking member bases may comprise a number of holes for receiving fastening elements.

In one embodiment, the connecting arrangement is a snap-fit arrangement. The first or second locking member base 317, 322 may thus comprise at least one retention member 312 each provided with a retention heel 319. The other of the first or second locking member base 317, 322 is provided with at least one through-hole for receiving the retention member(s) 312. Upon insertion of the retention member(s) in the corresponding through-hole(s) the retention heel 319 of the retention member is arranged to resiliently grip to the base provided with the through-holes and securing the first and second locking base together.

The second locking member 320 may comprise at least one hole 324 extending in a horizontal direction orthogonal to the sliding door rail for receiving a fastening element to attach the second locking member 320 to the wagon member 130. The second locking member 320 may further comprise an attachment flange 323 arranged to abut to an upper surface of the wagon member 130. The attachment flange 323 may extend in a horizontal direction orthogonal to the sliding door rail.

It should be appreciated that even though numerous characteristics and advantages of the present invention have been set forth in the foregoing description, together with details of the structure and function of the invention, the description is only illustrative and changes may be made in detail, especially in matters of shape, size and arrangement of parts within the scope of the invention to the full extent indicated by the appended claims.

The invention claimed is:

1. A sliding door assembly comprising:
- a sliding door leaf;
- a sliding door rail;
- a door operating assembly for operating the sliding door leaf and, comprising a drive unit being configured to drive the sliding door leaf along the sliding door rail;
- a wagon member movable along the sliding door rail, the sliding door leaf having the wagon member attached thereto, said wagon member being in driving connection with the drive unit,
- an electric component mounted to the sliding door leaf;
- a cable arrangement for transferring power or communication signals between the door operating assembly and the electric component, said cable arrangement comprising a cable member routed to the electric component from the door operating assembly, whereby the cable member comprises a flexible portion having an end section which is fixed to the sliding door leaf to allow for extension of the flexible portion to compensate for movement of said sliding door leaf, and
- wherein the end section of the flexible portion is fixed to the wagon member by an attachment device, the attachment device comprising a first locking member provided with a first locking member aperture arranged to receive a support wire and the end section of the flexible portion and a second locking member provided with a locking protrusion, said end section being disposed between the locking protrusion and the first locking member, said locking protrusion being provided with a second locking member aperture coaxial with the first locking member aperture, said second locking member aperture being arranged to allow passage of the support wire therethrough, said attachment device further comprising a connecting arrangement for connecting the first and second locking members and thereby fixating the end section of the flexible portion between said first and second locking members.

2. The sliding door assembly according to claim 1, wherein at least a section of the flexible portion is routed in a substantially horizontal direction.

3. The sliding door assembly according to claim 2, wherein the support wire is arranged to support the flexible portion along the sliding door rail, wherein the flexible portion is at least partly routed along said support wire.

4. The sliding door assembly according to claim 3, wherein the support wire is elastic.

5. The sliding door assembly according to claim 3, wherein the flexible portion is wrapped around the support wire.

6. The sliding door assembly according to claim 1, wherein the flexible portion comprises a spiraled cable.

7. The sliding door assembly according to claim 1, wherein said flexible portion is in a relaxed state when the sliding door leaf is in a closed position and an extended state when the sliding door leaf is in an opened position.

8. The sliding door assembly according to claim 1, wherein the end section of the flexible portion is fixed to the sliding door leaf by being attached to the wagon member.

9. The sliding door assembly according to claim 1, wherein the end section of the flexible portion is wrapped around said locking protrusion.

10. The sliding door assembly according to claim 9, wherein the first locking member comprises a locking section provided with the first locking member aperture, said locking section arranged to at least partially surround the locking protrusion when the first and second locking members are connected to thereby fixate the end section of the flexible portion between the locking protrusion and an inner surface of said locking section.

11. The sliding door assembly according to claim 10, wherein the inner surface of the locking section of the first locking member and an outer surface of the locking protrusion of the second locking member are each funnel shaped.

12. The sliding door assembly according to claim 10, wherein the inner surface of the locking section of the first locking member and an outer surface of the locking protrusion of the second locking member are each conical.

13. The sliding door assembly according to claim 1, wherein the sliding door leaf comprises a first sliding door leaf and a second sliding door leaf, wherein the electric component comprises first and second electric components mounted to the first and second door leaves, respectively, wherein the cable member comprises a first cable member routed to the first electric component and a second cable member routed to the second electric component, wherein the flexible portion comprises first and second flexible portions of the first and second cable members, respectively, wherein the end section comprises first and second end sections of the first and second flexible portions, respectively, and wherein the first and second end sections are fixed to the first and second sliding door leaves, respectively, to allow for extension of the first and second flexible portions to compensate for movement of the first and second sliding door leaves.

14. The sliding door assembly according to claim 13, wherein said first and second flexible portions are in a relaxed state when the first and second sliding door leaves are in a closed position and an extended state when the first and second sliding door leaves are in an opened position.

* * * * *